(12) United States Patent
Malmberg et al.

(10) Patent No.: US 11,300,029 B2
(45) Date of Patent: Apr. 12, 2022

(54) SCR CATALYST DEVICE CONTAINING VANADIUM OXIDE AND MOLECULAR SIEVE CONTAINING IRON

(71) Applicant: UMICORE AG & CO. KG, Hanau-Wolfgang (DE)

(72) Inventors: Stephan Malmberg, Frankfurt (DE); Nicola Soeger, Nidderau (DE)

(73) Assignee: UMICORE AG & CO, KG, Hanau-Wolfgang (DE)

( * ) Notice: Subject to any disclaimer, the term of this patent is extended or adjusted under 35 U.S.C. 154(b) by 0 days.

(21) Appl. No.: 16/469,835

(22) PCT Filed: Dec. 20, 2017

(86) PCT No.: PCT/EP2017/083687
§ 371 (c)(1),
(2) Date: Jun. 14, 2019

(87) PCT Pub. No.: WO2018/115044
PCT Pub. Date: Jun. 28, 2018

(65) Prior Publication Data
US 2020/0088080 A1    Mar. 19, 2020

(30) Foreign Application Priority Data
Dec. 20, 2016 (EP) .................................. 16205231

(51) Int. Cl.
*F01N 3/28* (2006.01)
*F01N 3/20* (2006.01)
*B01J 21/06* (2006.01)
*B01J 23/22* (2006.01)

(52) U.S. Cl.
CPC .......... *F01N 3/2803* (2013.01); *B01J 21/063* (2013.01); *F01N 3/2073* (2013.01); *B01J 23/22* (2013.01); *F01N 2370/04* (2013.01); *F01N 2510/0684* (2013.01); *F01N 2610/02* (2013.01)

(58) Field of Classification Search
None
See application file for complete search history.

(56) References Cited

U.S. PATENT DOCUMENTS

| | | | |
|---|---|---|---|
| 4,961,917 | A | 10/1990 | Byrne |
| 8,080,209 | B2 | 12/2011 | Shirino et al. |
| 8,568,678 | B2 | 10/2013 | Soeger et al. |
| 9,844,768 | B2 | 12/2017 | Suenobu et al. |
| 2008/0112871 | A1 | 5/2008 | Obayashi et al. |
| 2011/0138789 | A1* | 6/2011 | Chapman ............... B01J 21/063 60/302 |
| 2012/0058034 | A1 | 3/2012 | Ogunwumi et al. |
| 2012/0275977 | A1 | 11/2012 | Chandler et al. |
| 2013/0121902 | A1 | 5/2013 | Adelman et al. |
| 2015/0224486 | A1* | 8/2015 | Bauer ................. B01J 29/7815 423/213.5 |
| 2015/0238944 | A1 | 8/2015 | Narula et al. |
| 2016/0136626 | A1* | 5/2016 | Phillips .............. B01D 53/9477 423/239.2 |
| 2016/0367975 | A1* | 12/2016 | Lu ........................ B01J 35/0006 |
| 2019/0314801 | A1 | 10/2019 | Malmberg |

FOREIGN PATENT DOCUMENTS

| | | |
|---|---|---|
| CA | 2010970 A1 | 8/1990 |
| CN | 101144409 A | 3/2008 |
| CN | 101396655 * | 4/2009 |
| CN | 101588865 A | 11/2009 |
| CN | 102869431 A | 1/2013 |
| CN | 103260752 A | 8/2013 |
| CN | 103582523 A | 2/2014 |
| CN | 104582845 A | 4/2015 |
| CN | 105026038 A | 11/2015 |
| CN | 105163852 A | 12/2015 |
| DE | 10 2006 031 661 A1 | 1/2008 |
| DE | 10 2007 003 155 A1 | 7/2008 |
| DE | 10 2014 002 751 A1 | 10/2014 |
| EP | 0 385 164 B1 | 10/1993 |
| EP | 2298434 | 3/2011 |
| EP | 2992956 * | 4/2014 |
| EP | 2 992 956 A1 | 3/2016 |
| JP | 2015-182067 A | 10/2015 |
| WO | 2008/006427 A1 | 1/2008 |
| WO | 2008/089957 A1 | 7/2008 |
| WO | 2009/103549 A1 | 8/2009 |
| WO | 2014/027207 A1 | 2/2014 |

(Continued)

OTHER PUBLICATIONS

International Search Report for PCT/EP2017/083687, dated Mar. 23, 2018 (8 pgs. with English translation).
Written Opinion of the International Searching Authority for PCT/EP2017/083687, dated Mar. 23, 2018 (7pgs.).
M. Ziran, et al. "Low-temperature SCR activity and $SO_2$ deactivation mechanism of Ce-modified $V_2O_5$-$WO_3$/$TiO_2$ catalyst" Progress in Natural Science Materials International, vol. 25, No. 4, Aug. 30, 2015 (pp. 342-352).
Y. Huang, et al. "Low temperature selective catalytic reduction of NO by ammonia over $V_2O_5$-$CeO_2$/$TiO_2$," Journal of Fuel Chemistry and Technology, vol. 36, No. 5, Oct. 15, 2008 pp. 616-620).

(Continued)

*Primary Examiner* — Sheng H Davis
(74) *Attorney, Agent, or Firm* — Smith, Gambrell & Russell, LLP (57) ABSTRACT

The invention relates to a catalyst device for purifying exhaust gases containing nitrogen oxide by using selective catalytic reduction (SCR), the catalyst device comprising at least two catalytic layers, the first layer containing vanadium oxide and a mixed oxide comprising titanium oxide and silicon oxide and the second layer containing a molecular sieve containing iron, wherein the first layer is applied onto the second layer. The invention also relates to uses of the catalyst device and a method for purifying exhaust gases.

21 Claims, 6 Drawing Sheets

(56) References Cited

FOREIGN PATENT DOCUMENTS

| WO | 2014178636 | * | 11/2014 |
| WO | 2016/011366 A1 | | 1/2016 |
| WO | 2018/115045 A1 | | 6/2018 |

OTHER PUBLICATIONS

K. M. Hyeon, et al. "Effect of Fe-zeolite on formation of $N_2O$ in selective reduction of NO by $NH_3$ over $V_2O_5$-$WO_3TiO_2$ catalyst" Research on Chemical Intermediates, vol. 42, No. 1, Nov. 4, 2015 (pp. 171-184).

International Preliminary Report on Patentability dated Jun. 25, 2019 in International Patent Application No. PCT/EP2017/083687 (8 pages in German with English translation).

Kröcher, O. et al. Combination of $V_2O_5$/$WO_3$-$TiO_2$, Fe-ZSM5, and Cu-ZSM5 Catalysts for the Selective Catalytic Reduction of Nitric Oxide with Ammonia. Industrial & Engineering Chemistry Research, 2008. vol. 47, No. 22, pp. 8588-8593.

Chen, L. et al. Promotional Effect of Ce-doped $V_2O_3$. Journal of Physical Chemistry C. 2009. vol. 113, No. 50, pp. 21177-21184.

Kim, S. S., et al. Redox Characteristics of $O_2$ and $NO_2$ in the Fast $NH_3$-Selective Catalytic Reduction of NOx Over Vanadium-Based Catalyst. Environmental Engineering Science. 2010, vol. 27, No. 10, pp. 845-852.

Coombs, D. S., et al. Recommended nomenclature for zeolite minerals: report of the subcommittee on zeolites of the International Mineralogical Association, Commission on New Minerals and Mineral Names. Mineralogical Magazine. 1998. vol. 62, No. 4, pp. 533-571.

X. Wang, et al., Catalyst performance and hydrothermal durability of $CeO_2$-$V_2O_5$-$ZrO_2$/$WO_3$-$TiO_2$ based $NG_3$-SCR Catalysis Science & Technology, Jun. 13, 2012 (pp. 1386-1395).

Non Final Office Action dated Mar. 2, 2021 in U.S. Appl. No. 16/469,866 (15 Pages).

Chinese Office Action dated Apr. 27, 2021 in Chinese Patent Application No. 201780078986.6 (11 pages in Chinese with English translation).

Kim, M.H., et al. Effect of FE-zeolite on formation of $N_2O$ in selective reduction of NO by $NH_3$ over $V_2O_5$-$WO_3$/$TiO_2$ catalyst. Res Chem International. 2016. vol. 42, pp. 171-184.

Chinese Office Action dated May 18, 2021 received in CN Patent Application 201780078987.0 (9 pages in Chinese with English translation).

Final Office Action dated Jul. 15, 2021 in U.S. Appl. No. 16/469,866 (8 pages).

* cited by examiner

SCR CATALYST DEVICE CONTAINING VANADIUM OXIDE AND MOLECULAR SIEVE CONTAINING IRON

The invention relates to a catalyst device for purifying exhaust gases containing nitrogen oxide by using selective catalytic reduction (SCR), comprising at least two catalytic layers, the first layer containing vanadium oxide and the second layer containing a molecular sieve containing iron, wherein the first layer is applied onto the second layer. The invention also relates to uses of the catalyst device and to methods for purifying exhaust gases.

PRIOR ART

The method of selective catalytic reduction (SCR) is used in the prior art for reducing nitrogen oxides in exhaust gases, for example, from combustion plants, gas turbines, industrial plants or combustion engines. The chemical reaction is carried out with selective catalysts, hereinafter referred to as 'SCR catalysts,' which selectively remove nitrogen oxides, especially NO and $NO_2$, by reduction. In contrast, undesirable side reactions are suppressed. In the reaction, a reductant containing nitrogen is fed in, usually ammonia ($NH_3$) or a precursor compound, such as urea, which is added to the exhaust gas. The reaction is a comproportionation. Essentially water and elemental nitrogen are obtained as reaction products. SCR catalysts often contain metal oxides, such as oxides of vanadium, titanium, tungsten, zirconium or combinations thereof. As SCR catalysts, molecular sieves are also often used, in particular zeolites, which are exchanged with catalytically active metals.

An important application of SCR is the removal of nitrogen oxides from exhaust gases from combustion engines which are predominantly operated with a lean air/fuel ratio. Such combustion engines are diesel engines and direct-injection gasoline engines. These are collectively referred to as 'lean-burn engines.' In addition to the harmful gases carbon monoxide CO, hydrocarbons HC and nitrogen oxides NOx, the exhaust gas from lean-burn engines contains a relatively high oxygen content of up to 15 vol %. Carbon monoxide and hydrocarbons can easily be rendered harmless by oxidation. The reduction of nitrogen oxides to nitrogen is much more difficult due to the high oxygen content.

Since combustion engines in motor vehicles are operated transiently, the SCR catalyst must guarantee the highest possible nitrogen oxide conversions with good selectivity even under strongly fluctuating operating conditions. A complete and selective nitrogen oxide conversion at low temperatures must be ensured, as must the selective and complete conversion of high nitrogen oxide quantities in very hot exhaust gas, for example during full load driving. In addition, the strongly fluctuating operating conditions cause difficulties with the exact dosing of the ammonia, which should ideally take place in a stoichiometric ratio to the nitrogen oxides to be reduced. This places high demands on the SCR catalyst, i.e. on its ability to reduce nitrogen oxides to nitrogen with high conversion and selectivity rates in a wide temperature window with highly variable catalyst loads and a fluctuating supply of reductant.

EP 0 385 164 B1 describes so-called 'full catalysts' for the selective reduction of nitrogen oxides with ammonia, which, in addition to titanium oxide and at least one oxide of tungsten, silicon, boron, aluminum, phosphorus, zirconium, barium, yttrium, lanthanum and cerium, contain an additional component selected from the group of oxides of vanadium, niobium, molybdenum, iron and copper.

U.S. Pat. No. 4,961,917 relates to catalyst formulations for reducing nitrogen oxides with ammonia, which, in addition to zeolites with a silica:alumina ratio of at least 10 and a pore structure which is linked in all spatial directions by pores having an average kinetic pore diameter of at least 7 angstroms, contain iron and/or copper as promoters.

However, the catalyst devices described in the above documents need to be improved, because good nitrogen oxide conversion rates can only be achieved at relatively high temperatures of above approximately 350° C. or above approximately 450° C. As a rule, optimum conversion only takes place within a relatively narrow temperature range. Such an optimum conversion is typical for SCR catalysts and is determined by the mechanism of action.

The reaction of nitrogen oxides on SCR catalysts with ammonia, which can be formed from a precursor compound such as urea, is carried out according to the following reaction equations:

$$4NO + 4NH_3 + O_2 \rightarrow 4N_2 + 6H_2 \tag{1}$$

$$NO + NO_2 + 2NH_3 \rightarrow 2N_2 + 3H_2O \tag{2}$$

$$6NO_2 + 8NH_3 \rightarrow 7N_2 + 12H_2O \tag{3}$$

It is advantageous to increase the proportion of $NO_2$ and, in particular, to adjust an $NO_2$:NO ratio of approximately 1:1. Under these conditions, significantly higher conversion rates can already be achieved at low temperatures below 200° C. due to the significantly faster reaction (2) ('rapid SCR reaction') as compared to reaction (1) ('standard SCR reaction').

However, the nitrogen oxides NOx contained in the exhaust gas from lean-burn engines consist predominantly of NO and have only small proportions of $NO_2$. In the prior art, an upstream oxidation catalyst, for example, platinum supported on alumina, is therefore used for the oxidation of NO to NOx.

A further problem with the removal of nitrogen oxides in the exhaust gas of lean-burn engines with SCR catalysts is that the ammonia is oxidized to low-valent nitrogen oxides, especially nitrous oxide ($N_2O$), due to the high oxygen content. This removes the reductant required for the SCR reaction from the process on the one hand, and the nitrous oxide escapes as an undesired secondary emission on the other hand.

In order to solve the described goal conflicts and to be able to ensure that nitrogen oxides are removed at all operating temperatures occurring during driving operation, which often lie between 180° C. and 600° C., combinations of various SCR catalysts which are to combine advantageous properties are proposed in the prior art.

US 2012/0275977 A1 relates to SCR catalysts in the form of molecular sieves. These are zeolites containing iron or copper. In order to remove nitrogen oxides as comprehensively as possible, various molecular sieves with different functionalities are preferably combined.

US 2012/0058034 A1 proposes combining zeolites with a further SCR catalyst based on oxides of tungsten, vanadium, cerium, lanthanum and zirconium. The zeolites are mixed with the metal oxides and a suitable substrate is coated therewith, whereby a single catalyst layer having both functionalities is obtained.

In the prior art, vanadium-based SCR catalysts were also combined with iron-exchanged zeolites. For example, WO 2014/027207 A1 discloses SCR catalysts containing, as a first catalytic component, an iron-exchanged molecular sieve and, as a second component, a vanadium oxide coated on a metal oxide selected from aluminum, titanium, zirconium, cerium or silicon. The various catalysts are mixed and a single catalytic coating is produced on a suitable substrate. However, the efficiency of such a catalyst in the temperature range below 450° C. and especially below 350° C. is still in need of improvement.

WO 2009/103549 discloses combinations of zeolites and vanadium oxide in combination with further metal oxides. In order to improve catalyst efficiency, it is proposed that the catalyst be divided into zones. A zone with the zeolite, which serves as an $NH_3$ storage component, is located on the exhaust gas inlet side. A zone with the SCR-active component, which contains the vanadium-based SCR catalyst, then adjoins on the outlet side. The zeolite has only one storage function, while the following component catalyzes the SCR reaction with vanadium oxide.

WO 2008/006427 A1 relates to combinations of iron-exchanged zeolites with copper-exchanged zeolites. It specifically proposes coating a ceramic substrate first with the copper-exchanged zeolite, and forming a coating with the iron-exchanged zeolite over it. In these ways, the different activities of the layers within different temperature ranges are to be combined in an advantageous manner.

WO 2008/089957 A1 proposes to equip a ceramic substrate with a lower coating containing vanadium oxide and an upper coating containing iron-exchanged zeolites. The upper coating with the iron-exchanged zeolite is intended to prevent nitrous oxide from being formed at high operating temperatures.

EP 2 992 956 A1 describes an SCR catalyst having a 'dual-layer structure,' wherein a layer containing $V_2O_5/TiO_2$ lies upon a layer comprising a metal-exchanged zeolite.

DE 10 2014 002 751 A1 also discloses an SCR catalyst comprising two layers located upon a catalyst honeycomb body. While the lower layer can comprise zeolites exchanged with iron or copper, the upper layer comprises vanadium pentoxide and titanium dioxide.

SCR catalysts comprising vanadium-based formulations and Cu or Fe zeolites are also disclosed in WO 2016/011366 A1, DE 10 2006 031 661 A1 as well as in Ind. Eng. Chem. Res. 2008, 47, 8588-8593.

The SCR catalysts described are however still in need of improvement with regard to their efficiency. There is a continuous need for catalysts that are highly efficient under various application conditions. In particular, there is a need for catalysts that are suitable for the purification of both NO-rich and $NO_2$-rich exhaust gases and that operate efficiently over the entire temperature range of common applications, that is, at low and medium temperatures as well.

Another problem with conventional catalysts is that nitrous oxide is formed in conventional applications involving combustion engines. This problem is particularly evident in the middle and low temperature range below about 450° C. or below about 350° C. Exhaust gases from combustion engines often have such temperatures during normal operation, which can lead to the undesirable formation and release of nitrous oxide.

J. Phys. Chem. C2009, 113, 2, 1177-21184 reports that the conversion of nitrogen monoxide (NO) with ammonia on $V_2O_5$—$WO_3/TiO_2$ SCR catalysts can be improved by adding cerium oxide to the SCR catalysts mentioned. However, the measurements carried out involved SCR catalysts which contained only 0.1 wt % vanadium and are therefore irrelevant in practice. The same applies with regard to the data reported in Progress in Natural Science Materials International, 25 (2015), 342-352. The documents do not contain any data concerning the conversion of nitrogen dioxide ($NO_2$).

J. Fuel. Chem. Technol., 2008, 36(5), 616-620 also includes data on the influence of the cerium oxide content on $V_2O_5$—$CeO_2/TiO_2$ SCR catalysts in the conversion of nitrogen monoxide (NO) with ammonia. Positive effects of cerium oxide are accordingly observed only with contents of 20 wt % and above. The document does not contain any data concerning the conversion of nitrogen dioxide ($NO_2$).

It is known that NOx conversion with ammonia in the presence of $V/TiO_2$ SCR catalysts depends very strongly on the $NO_2/NOx$ molar ratio; see, for example, Environmental Engineering Science, Vol. 27, 10, 2010, 845-852, in particular FIG. 2. Thus, the results of the conversion of NO cannot be used to predict results in the conversion of $NO_2$ or of NOx with a high $NO_2$ proportion.

Figure 6:
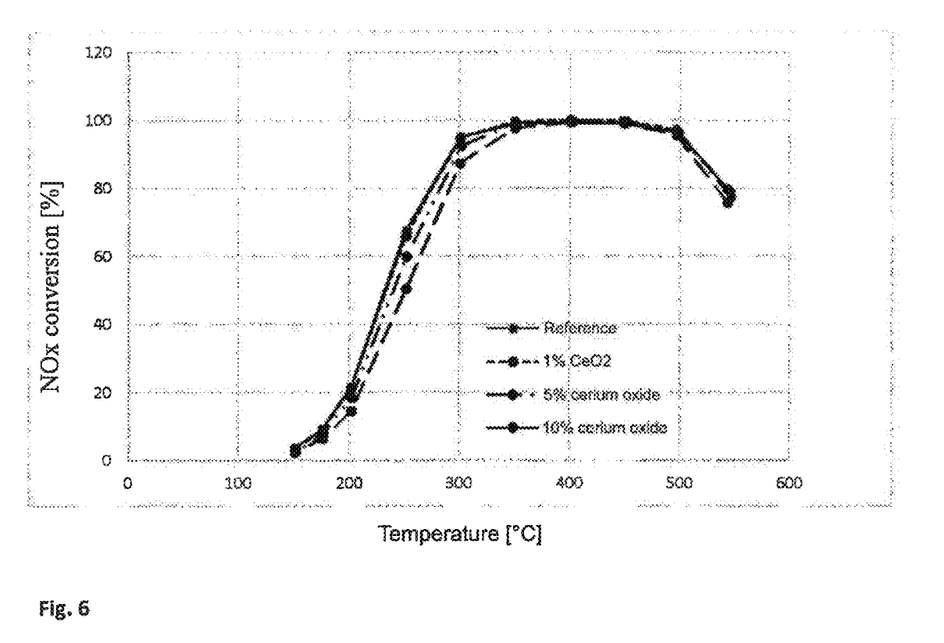
FIGS. 6 and 7 show the dependence of the conversion on the respective NO and $NO_2$ content of the exhaust gas.
Figure 7:
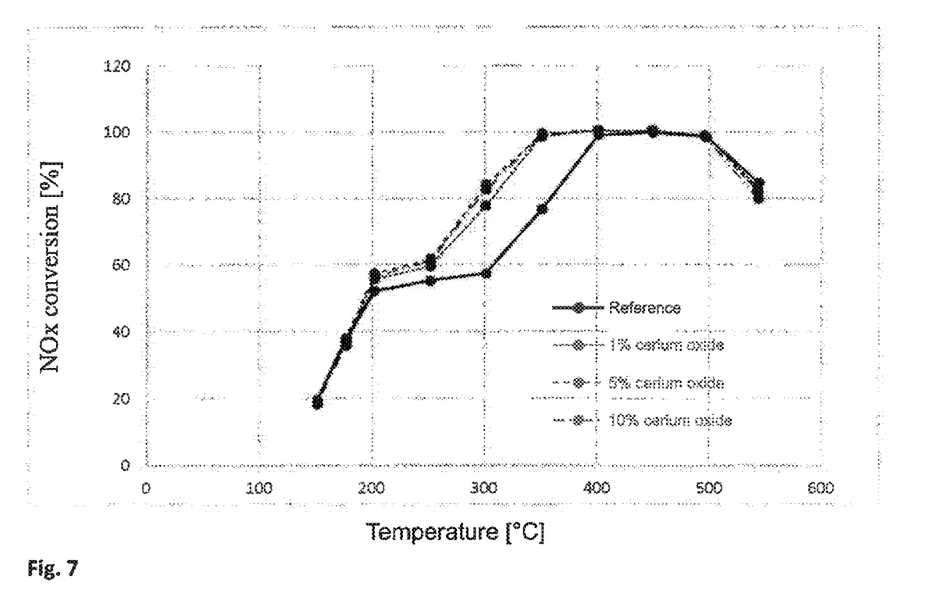

Studies conducted by the inventors of the present application show that the conversion of nitrogen oxides with ammonia at low temperatures on SCR catalysts containing vanadium and cerium depends in particular on the composition of the nitrogen oxide. In the case that the nitrogen oxide consists only of nitrogen monoxide (NO), the conversion decreases as the cerium oxide content increases. However, this changes as the content of nitrogen dioxide ($NO_2$) increases. Thus, for example, with a nitrogen dioxide content of 75%, the conversion increases as the cerium oxide proportion increases; see FIGS. 6 and 7.

Object of the Invention

The invention is based upon the object of providing catalysts, methods and uses that overcome the disadvantages described above. In particular, SCR catalysts are to be provided which enable an efficient removal of nitrogen oxides over a wide temperature range, and thus also at low and medium temperatures. Here, nitrogen oxides NOx, in particular NO and $NO_2$, should be efficiently removed while at the same time the formation of nitrous oxide $N_2O$ is to be prevented. The catalysts should have a high efficiency, especially in the temperature range of 180° C. to 600° C., which is regularly of importance in combustion engines.

The catalysts should be suitable for purifying exhaust gases having a relatively high proportion of $NO_2$, in particular when the $NO_2$:NO ratio is ≥1:1. Here, the catalysts should be efficient even at low temperatures, where catalysts of the prior art are often less efficient, for example, below 450° C. or below 350° C. The catalysts should also be suitable for purifying exhaust gases having a relatively high proportion of NO.

In particular, catalysts are to be provided that combine the following advantageous properties;
a high efficiency with exhaust gases rich in $NO_2$ in the temperature range from about 180° C. to 600° C., and in particular at low temperatures,
a high efficiency with exhaust gases rich in NO, and
the prevention of the formation of nitrous oxide.
The catalysts should preferably be effective both immediately after their production and also after a prolonged period of use and aging.

DISCLOSURE OF THE INVENTION

Surprisingly, the object underlying the invention is achieved by catalyst devices, uses and methods according to the claims.

The object of the invention is a catalyst device for purifying exhaust gases containing nitrogen oxide by selective catalytic reduction (SCR), said device comprising at least two catalytic layers, wherein the first layer contains vanadium oxide and a mixed oxide comprising titanium oxide and silicon oxide and the second layer contains a molecular sieve containing iron, the first layer being applied onto the second layer.

The catalyst device is used for reducing nitrogen oxides ('NOx') in exhaust gases by the method of 'selective catalytic reduction' (SCR). The exhaust gases can, for example, come from combustion engines, combustion plants, gas turbines or industrial plants. During the SCR, nitrogen oxides, especially NO and $NO_2$, are selectively reduced. The reaction takes place in the presence of a reductant containing nitrogen, typically ammonia ($NH_3$) or a precursor compound thereof, such as urea. The reductant containing nitrogen is usually added to the exhaust gas.

The catalyst includes at least two catalytic layers, wherein a first, upper catalytic layer is disposed on the second, lower catalytic layer. 'Catalytic' here means that each of the layers has catalytic activity during the SCR. It is particularly preferred that the first, upper layer be in direct contact with the exhaust gases. This means that the first layer is the outermost layer over which no further layer is applied. It is however also possible according to the invention for at least one further functional layer, which serves, for example, to pre-treat the exhaust gases, to be present above the first layer. This pre-treatment can be, for example, a catalytic pre-treatment.

Within the context of this application, the term 'metal oxide' generally refers to oxides of the metal. Thus, the term does not refer solely to the metal monoxide with a stoichiometric ratio of 1:1. The term 'metal oxide' in this case designates both specific oxides and also mixtures of various oxides of the metal.

Within the context of this application, the term 'mixed oxide' excludes physical mixtures of two or more metal oxides. Rather, it stands for 'solid solutions' with a uniform crystal lattice, in which the individual metal oxides can no longer be distinguished or it stands for metal oxide agglomerates that do not have a uniform crystal lattice and in which phases of the individual metal oxides can be distinguished.

The first, upper layer contains vanadium oxide, which is preferably present as vanadium pentoxide $V_2O_5$. In this respect, it is not ruled out that a portion of the vanadium has a different oxidation state and is present in a different form. The vanadium oxide is preferably the crucial catalytically active component of the first layer which is largely responsible for the reaction. Hence, the first catalytic layer is hereinafter also referred to for short as the 'vanadium catalyst.'

The first, upper layer also contains a mixed oxide comprising titanium oxide and silicon oxide.

In a preferred embodiment, the first layer contains at least one further component selected from oxides of tungsten and aluminum. The first layer particularly preferably contains oxides of vanadium, silicon, tungsten and titanium, preferably in the form of $V_2O_5$, $SiO_2$, $WO_3$ and $TiO_2$.

In this case, the metal oxides can have catalytic activity during the SCR or contribute to catalytic activity. According to the invention, vanadium oxide and tungsten oxide, for example, have catalytic activity.

The metal oxides can also have little or no catalytic activity and can serve, for example, as substrate material. Such non-catalytic components serve, for example, to enlarge the inner surface area of the catalyst and/or to create a porous structure. Titanium oxide, for example, preferably serves as substrate material. It may contain proportions of other non-reactive or only slightly reactive metal oxides, such as silicon dioxide or aluminum trioxide. The substrate material is generally present in excess, wherein the catalytic component is generally applied to the surface of the inert component.

In a preferred embodiment, the main component of the first, upper layer is titanium dioxide making up, for example, more than 50 wt %, more than 80 wt % or more than 90 wt % of the layer. For example, a catalyst layer based on oxides of vanadium, silicon, titanium and tungsten essentially contains $TiO_2$ in the anatase modification. $TiO_2$ can be stabilized by $WO_3$ in order to achieve an improvement in thermal durability. In this case, the proportion of $WO_3$ is typically from 5 to 15 wt %, for example, from 7 to 13 wt %.

An advantage of the catalytic component based on vanadium oxide is its high activity during the SCR at low temperatures. According to the present invention, the low-temperature activity of the vanadium-based catalysts is advantageously combined with the specific activity of the molecular sieves containing iron so as to provide a catalyst having excellent cold-start properties.

In a preferred embodiment, the first layer additionally contains cerium oxide. Surprisingly, it has been found that SCR efficiency can be improved significantly by combinations of vanadium oxide with cerium oxide. The effect is particularly pronounced with a longer operating time of the catalyst, associated with aging of the catalyst. It has thus been found that after aging of the catalyst, both the removal of nitrogen oxides and the prevention of the formation of $N_2O$ is particularly effective if the vanadium catalyst in the first layer additionally contains cerium oxide. In general, the advantageous effect of cerium oxide is manifested above all in the low temperature range, in particular below 400° C., and especially in the range from 180 to 400° C. This is of particular advantage since it is at low temperatures that the optimal removal of nitrogen oxides and the prevention of the formation of nitrous oxide are particularly problematic. These effects are particularly pronounced in exhaust gas rich in $NO_2$, that is, when $NO_2:NOx>0.5$.

The catalyst preferably comprises from 0.5 to 10 wt %, in particular from 1 to 5 wt %, vanadium oxide, calculated as $V_2O_5$ and based on the weight of the first layer. The catalyst preferably comprises from 0.5 to 15 wt %, in particular from 1 to 7 wt %, silicon dioxide, calculated as $SiO_2$ and based on the weight of the first layer. The catalyst preferably comprises from 1 to 17 wt %, in particular from 2 to 10 wt %, tungsten oxide, calculated as $WO_3$ and based on the weight of the first layer. The catalyst preferably comprises from 0.2 to 10 wt %, in particular from 0.5 to 5 wt % or from 0.5 to 3 wt %, cerium oxide, calculated as $CeO_2$ and based on the weight of the first layer. The statement 'calculated as' takes into account that in this technical field, elemental analysis generally determines the quantities of metals.

In a preferred embodiment, the first layer preferably contains or consists of the following oxides of metals:
(a) from 0.5 to 10 wt % vanadium oxide, calculated as $V_2O_5$,
(b) from 0 to 17 wt % tungsten oxide, calculated as $WO_3$,
(c) from 0 to 10 wt % cerium oxide, calculated as $CeO_2$,
(d) from 25 to 98 wt % titanium oxide, calculated as $TiO_2$,
(e) from 0.5 to 15 wt % silicon oxide, calculated as $SiO_2$,
(f) from 0 to 15 wt % aluminum oxide, calculated as $Al_2O_3$ in each case based on the weight of the first layer.

The first layer particularly preferably contains vanadium dioxide, cerium oxide, titanium dioxide and silicon dioxide but not tungsten oxide.

The first layer also preferably contains 0.5 to 10 wt % vanadium oxide; 2 to 17 wt. % tungsten oxide; 0 to 7 wt % cerium oxide, as well as 25 to 98 wt % titanium dioxide, based on the weight of the first layer.

Likewise, the first layer particularly preferably contains vanadium oxide, tungsten oxide, cerium oxide, titanium dioxide and silicon dioxide.

In this case, the first layer preferably has the following composition:
(a) from 1 to 5 wt % vanadium oxide, calculated as $V_2O_5$,
(b) from 1 to 15 wt % tungsten oxide, calculated as $WO_3$,
(c) from 0.2 to 5 wt % cerium oxide, calculated as $CeO_2$,
(d) from 73 to 98 wt % titanium dioxide, and
(e) from 0.5 to 25 wt % silicon dioxide,
wherein the sum of the proportions of cerium oxide+tungsten oxide is less than 17 wt %, in each case based on the weight of the first layer.

The catalyst includes a second catalytic layer underlying the first layer with the vanadium catalyst. This second layer contains a molecular sieve containing iron.

The term 'molecular sieve' refers to natural and synthetic compounds, in particular zeolites, which have a strong adsorptive capacity for gases, vapors and dissolved substances of specific molecular sizes. By suitably selecting the molecular sieve, it is possible to separate molecules of different sizes. Besides zeolites, aluminum phosphates, in particular silicon aluminum phosphates, are, for example, also known. Molecular sieves generally have uniform pore diameters which are in the order of magnitude of the diameters of molecules and have a large inner surface area (600-700 m²/g).

In a particularly preferred embodiment, the molecular sieve is a zeolite. The term 'zeolite' is generally understood according to the definition of the International Mineralogical Association (D. S. Coombs et al., Can. Mineralogist, 35, 1997, 1571) to mean a crystalline substance from the group of aluminum silicates that has a three-dimensional network structure of the general formula $M^{n+}[(AlO_2)X(SiO_2)Y]xH_2O$. The basic structure is formed from $SiO_4/AlO_4$ tetrahedra, which are linked by common oxygen atoms to form a regular three-dimensional network. The zeolite structure contains cavities and channels that are characteristic of each zeolite. The zeolites are classified into different structures according to their topology. The zeolite framework contains open cavities in the form of channels and cages that are normally occupied by water molecules and special framework cations that can be exchanged.

The inlets to the cavities are formed by 8, 10 or 12 'rings' (narrow-pored, medium-pored and wide-pored zeolites). In a preferred embodiment, the zeolite has a structure in the second, lower layer whose maximum ring size is defined by more than 8 tetrahedra.

According to the invention, zeolites with the topologies AEL, AFI, AFO, AFR, ATO, BEA, GME, HEU, MFI, MWW, EUO, FAU, FER, LTL, MAZ, MOR, MEL, MTW, OFF and TON are preferred. Zeolites of the topologies FAU, MOR, BEA, MFI and MEL are particularly preferred.

In the context of the present invention, preference is given to using a zeolite, in particular any 10-ring and 12-ring zeolite, which has a $SiO_2/Al_2O_3$ molar ratio (SAR ratio) of 5:1 to 150:1. The $SiO_2/Al_2O_3$ ratio preferred according to the invention lies within the range from 5:1 to 50:1 and particularly preferably within the range from 10:1 to 30:1.

The molecular sieve in the second layer contains iron and is preferably an iron-containing zeolite. It has been found that iron-containing zeolites in combination with the first layer containing vanadium oxide catalyze a particularly efficient SCR in the layer arrangement according to the invention. Preference is given to using a zeolite which is exchanged with iron ions ('iron-exchanged zeolite') or in which at least a portion of the aluminum atoms of the aluminosilicate framework is isomorphously substituted with iron, thus forming a ferrosilicate framework.

The zeolite is particularly preferably exchanged with iron. The zeolite is preferably one of the BEA type. Very particular preference is given to an iron-exchanged zeolite of the BEA type with an SAR of 5:1 to 50:1. Methods for producing iron-containing zeolites, for example via solid or liquid phase exchange, are known to the person skilled in the art. The proportion of iron in the iron-containing zeolite is, for example, up to 10% or up to 15%, calculated as $Fe_2O_3$ and based on the total amount of the iron-containing zeolite, Zeolites containing iron and iron-exchanged zeolites preferred according to the invention are described, for example, in US 2012/0275977 A1.

In a preferred embodiment, the second layer contains at least two different iron-containing zeolites. It is advantageous in this case that various desired properties can be combined. For example, an iron-containing zeolite that is active at low temperatures can be combined with an iron-containing zeolite that is active at higher temperatures.

Instead of an iron-containing zeolite, the second layer can also contain a ferrosilicate or ferrosilicates.

The second, lower layer can contain further components in addition to the molecular sieve containing iron, in particular catalytically inactive components, such as binders. For example, catalytically inactive or only slightly catalytically active metal oxides, such as $SiO_2$, $Al_2O_3$ and $ZrO_2$, are, for example, suitable as binders. The proportion of such binders in the second layer is, for example, up to 15%.

The thickness of the first and second layer and the amount of catalysts in the first and second layers are adjusted to each other so as to obtain a desired removal of nitrogen oxides.

In a preferred embodiment, the catalyst device additionally comprises a substrate in addition to the first and second coating. The substrate is a device onto which the catalytic coatings are applied. The substrate is not catalytically active here, i.e. it is inert as regards the reaction. The substrate may be a metallic or ceramic substrate. The substrate may have a honeycomb structure of parallel exhaust gas flow channels or be a foam. In a preferred embodiment, the substrate is a monolith. Monoliths are one-piece ceramic substrates which are used in particular in the automotive industry and have parallel channels which run from the inlet side to the outlet side and through which the exhaust gases flow. This structure is also referred to as a 'honeycomb.' Alternatively, the substrate can be a filter, in particular a wall-flow filter, in which the exhaust gases flow on the inlet side into channels closed on the outlet side, flow through the channel walls and then leave the substrate through channels closed on the inlet side and open on the outlet side.

In a further embodiment, the second, lower layer simultaneously serves as a substrate. This is possible in particular if the second, lower catalytic layer is provided as an extrudate. In this case, the second, lower layer itself forms a substrate device onto which the first, upper layer is applied. Such a substrate device is obtainable, for example, when the iron-containing zeolite is incorporated into the walls of the exhaust gas channels. This embodiment has the advantage that no additional inert substrate is required so that the interior of the catalyst device can be given a particularly compact design.

In a further preferred embodiment, the second layer is applied directly onto the substrate. Alternatively, at least one further functional layer, for example, a further catalytic layer having different catalyst compounds and thereby introducing a further activity, can also be present between the substrate and the second layer.

The entire interior of the catalyst device according to the invention is preferably coated. This means that all regions which the exhaust gases contact are coated. It is preferable here that the entire interior is fully coated with the first and second layer. In this embodiment, a particularly efficient conversion of nitrogen oxides is obtained since the entire inner surface area of the device is used catalytically.

In general, it is highly preferred for the exhaust gases to first come into contact in the flow direction with the first, upper layer which comprises the vanadium catalyst. Without being bound by any theory, it is assumed that an exhaust gas fraction, which was pre-treated with the vanadium catalyst, then advantageously reacts with the iron-containing zeolite so that a particularly efficient depletion of nitrogen oxides is achieved while simultaneously preventing the formation of nitrous oxide. In particular, it has been found that the arrangement of the catalysts in this order leads to a particularly efficient purification of NOx, even at relatively low temperatures, and to the prevention of the formation of nitrous oxide, particularly in the case of high levels of $NO_2$ in the NOx.

In a preferred embodiment, the second layer is applied completely to the substrate. In this case, the first layer may be present on the second layer completely or only partially (in one or more zones).

In a preferred embodiment, the first layer is applied completely to the second layer. This means that there is no region on the inner surface of the catalyst device in which the lower, second layer is in direct contact with the exhaust gases. In this case, it is advantageous that only exhaust gases that have been pre-treated in the first, upper layer reach the lower, second layer.

In a further preferred embodiment, the first layer is applied onto the second layer in certain regions. In this embodiment, there are regions in which the lower, second layer comes into direct contact with the exhaust gases. In this case, it is highly preferred that the exhaust gases first come into contact with the first, upper layer. Thus, it is especially preferred that a region which has a first, upper layer is first in the flow direction. In this embodiment, it is also ensured that the exhaust gases first come into contact with the upper layer containing the vanadium catalyst and are thereby pre-treated before they reach the second layer.

In a preferred embodiment, the exhaust gases as they leave the catalyst device lastly come into contact with the first, upper layer. A reaction with the vanadium oxide thus takes place last. In this case, the second, lower layer is preferably present beneath the first, upper layer at the outlet of the catalyst device. In such an embodiment of the device, the SCR is particularly efficient.

For the reasons stated, it is altogether particularly preferred for the interior of the catalyst device to be completely equipped with the second, lower layer, on which the first, upper layer is completely present.

In a further preferred embodiment, the first layer or the second layer consists of two or more superimposed sub-layers. The sub-layers can differ, for example, with regard to their physical properties, such as density or porosity, or their chemical properties, such as the composition of the individual components. For example, the first, upper layer can consist of an upper sub-layer which contains vanadium oxide and a lower sub-layer which contains vanadium oxide and additionally cerium oxide. The lower, second layer can, for example, consist of a first and a second sub-layer that contain iron-containing zeolites with various activities. In these embodiments, it is advantageous that by a suitable selection and by combinations of different catalysts of the same type, their properties can be combined in a targeted manner in order, for example, to obtain a reactivity within a wide temperature range.

In a further embodiment, the catalyst device has different regions (zones) which follow one another in the exhaust-gas flow direction. In this case, different catalysts of the first and/or the second layer can be combined in different zones in order to obtain advantageous properties of the catalyst device. It is thus conceivable, for example, for a zone with a first and second catalyst to be present on the inlet side, said zone being particularly efficient at relatively high temperatures, while toward the outlet side there is a zone which has an activity optimum at a lower temperature. The catalyst device may have a plurality of successive zones, for example 2, 3, 4 or 5 zones.

In a preferred embodiment, the catalyst device has no further layers beyond the first and the second layer, in particular no further catalytic layers, and above all no further layers containing vanadium oxide or iron-containing zeolites.

The catalyst device preferably does not contain any noble metal. In particular, the first and second layers do not contain any noble metals, such as platinum, gold, palladium and/or silver. According to the invention, a catalyst device having a high efficiency is provided without requiring the use of noble metals that are expensive and not available in large quantities.

The SCR catalyst is applied using methods known in the prior art, for example, by applying coating suspensions (so-called 'wash coats'), by coating in an immersion bath or by spray coating. The lower layer may also be an extrudate. Application of the coatings with wash coats is particularly preferred. As is generally customary, wash coats refer to coating suspensions in which the solids or precursor compounds are suspended and/or dissolved in order to produce the catalytic layers. Such wash coats are provided in a very homogeneous form with finely distributed constituents so that the substrates can be coated as uniformly as possible. After application of the wash coats, the usual post-treatment steps follow, such as drying, calcining and tempering.

In a preferred embodiment, the ratio of the weight (per catalyst volume) of the first to the second layer in the catalyst device is greater than 0.2, in particular is between 0.2 and 15, and particularly preferably is between 1 and 6.

The total amount of coating is selected such that the device as a whole is utilized as efficiently as possible. In the case of a flow-through substrate, for example, the total amount of coatings (solids content) per substrate volume (total volume of the catalyst device) may be between 100 and 600 g/l, in particular between 100 and 500 g/l. Preferably, the second, lower layer is used in a quantity of 50 to 200 g/l, in particular between 50 and 150 g/l, particularly preferably of approximately 100 g/l. The first, upper layer is preferably used in an amount of 100 to 400 g/l, in particular between 200 and 350 g/l, particularly preferably about 280 g/l. In the case of a filter substrate, substantially less wash coat is generally used, for example, in a total amount of 10 to 150 g/l.

The invention also relates to the use of a catalyst device according to the invention for purifying exhaust gases containing nitrogen oxide by selective catalytic reduction (SCR).

Likewise, the present invention also relates to a method for removing nitrogen oxides from the exhaust gas of combustion engines operated with a lean air/fuel ratio, said method being characterized in that the exhaust gas is passed through a catalyst device according to the invention.

The method according to the invention is particularly advantageous when the $NO_2$ proportion in the nitrogen oxide exceeds 50% ($NO_2/NO>0.5$), i.e. is, for example, 75%.

The exhaust gases are preferably those from combustion plants. The combustion plants can be mobile or stationary. For the purposes of this invention, mobile combustion devices are, for example, the combustion engines of motor vehicles, in particular diesel engines. Stationary combustion devices are usually power plants, combustion plants, or heating systems in private households.

The exhaust gases preferably originate from lean-burn engines, that is to say, combustion engines operated predominantly with a lean air/fuel ratio. Lean-burn engines are in particular diesel engines and direct-injection gasoline engines.

Depending on various influencing factors (such as engine calibration, operating state, type and design of upstream catalysts), the $NO_2$ proportion in the NOx may exceed 50%. According to the invention, it has been found that the catalyst device particularly efficiently catalyzes the SCR of exhaust gases with a high $NO_2$ content ($NO_2/NOx>0.5$), namely even in the problematic medium to low temperature range below about 450° C., in particular below 350° C. In particular, it has been found that with such exhaust gases, an efficient removal of the nitrogen oxides is achieved with a simultaneous prevention of the formation of nitrous oxide. These results were surprising since it was known in the prior art that vanadium catalysts are relatively inefficient in the SCR with exhaust gases rich in $NO_2$, especially at low temperatures, while the more efficient iron-zeolite catalysts produce a high proportion of $N_2O$.

In a preferred embodiment, the exhaust gases originate from an upstream oxidation catalyst. Such upstream oxidation catalysts are used in the prior art among other things in order to increase the proportion of $NO_2$ in the case of exhaust gases from lean-burn engines, in particular diesel engines.

When introduced into the catalyst device, the exhaust gases preferably have a relatively high oxygen content which is, for example, at least 5 vol %, at least 10 vol %, or at least 15 vol %. Exhaust gases from lean-burn engines regularly have such high oxygen contents. The oxidizing agent, oxygen, makes the reductive removal of nitrogen oxides by means of SCR more difficult. Surprisingly, it has been found that the catalyst devices according to the invention also efficiently remove nitrogen oxides from exhaust gases with a high oxygen content and at the same time prevent the formation of nitrous oxide.

Preferably, during the SCR reaction of exhaust gases with the catalyst device according to the invention, more than 90%, preferably more than 95%, of NOx and/or $NO_2$ are removed.

According to the invention, it is advantageous that an efficient purification of exhaust gases by SCR can also take place at relatively low temperatures, wherein it is precisely at low temperatures that the formation of nitrous oxide can be prevented. The use of the catalyst device is particularly advantageous at temperatures in the range below 450° C., in particular from 180 to 450° C., and particularly preferably between 200 and 350° C.

In a preferred embodiment, it is used for preventing the formation of nitrous oxide ($N_2O$), in particular in the purification of exhaust gases rich in $NO_2$ and in particular at temperatures below 450° C. or below 350° C. According to the invention, it has been found that an efficient depletion of nitrogen oxides can take place, while at the same time the formation of nitrous oxide is prevented or relatively little nitrous oxide is produced. According to the prior art, relatively high amounts of nitrous oxide form during the SCR reaction with vanadium catalysts and iron-containing zeolites, in particular in the purification of exhaust gases rich in $NO_2$ at low or even medium temperatures. It was therefore surprising that the arrangement according to the invention of the first and second layer results in an efficient SCR and at the same time only relatively small quantities of nitrous oxide are produced. Preferably, the concentration of nitrous oxide after the SCR with the catalyst device according to the invention is not higher than 50 ppm, 20 ppm or 10 ppm. In particular, such concentrations are not to be exceeded at temperatures ranging from 180° C. to 450° C., in particular from 200° C. to 350° C.

The invention also relates to a method for purifying exhaust gases, comprising the steps:
(i) Providing a catalyst device according to the invention,
(ii) Introducing exhaust gases containing nitrogen oxides into the catalyst device,
(iii) Introducing a reductant containing nitrogen into the catalyst device, and
(iv) Reducing nitrogen oxides in the catalyst device by selective catalytic reduction (SCR).

The method according to the invention is particularly advantageous when the $NO_2$ proportion in the nitrogen oxide exceeds 50% ($NO_2/NOx>0.5$), i.e. is, for example, 75%.

The exhaust gases introduced in step (ii) preferably come from lean-burn engines, in particular from an oxidation catalyst downstream of the engine. In the method, the catalyst device according to the invention can be combined in series or in parallel with further devices for purifying exhaust gases, such as further catalysts or filters.

During the SCR reaction, a reductant containing nitrogen, preferably ammonia ($NH_3$) or a precursor compound thereof, such as urea, is added. The reductant containing nitrogen is preferably added to the exhaust gas before it enters the catalyst device, but it can also be introduced separately into the catalyst device.

The catalyst device according to the invention achieves the object underlying the invention. A catalyst device for purifying exhaust gases by SCR is provided, which efficiently removes nitrogen oxides while preventing the formation of nitrous oxide. The device is suitable for purifying exhaust gases over a wide temperature range. It is suitable for purifying exhaust gases rich in $NO_2$ which arise in the operation of diesel engines, for example in conjunction with an oxidation catalyst. Even after aging, the catalyst device exhibits a high level of catalytic activity and prevents or minimizes the formation of nitrous oxide. The effect according to the invention can even be improved by adding cerium oxide to the vanadium catalyst, wherein among other things a further reduction of nitrous oxide, in particular at low temperature, can be achieved. Due to the high efficiency during the SCR under various conditions of use, even at low temperature and with both low and high $NO_2$ contents, the catalyst devices are highly suitable for applications in the automotive field.

FIGS. 1 to 5 show in graph form the results of the SCR reaction according to Exemplary Embodiment 3 with model exhaust gases with catalyst devices according to the invention and comparative devices, which were produced according to Example 2. In all of the figures, measured values are given for different temperatures of the model exhaust gases. Figures a and b each show the proportion of NOx removed from the model exhaust gas by the catalyst device. Figures c in each case indicate the concentration of $N_2O$ that was measured after the catalyst device.

EXEMPLARY EMBODIMENTS

Preliminary Tests

Figure 1A:
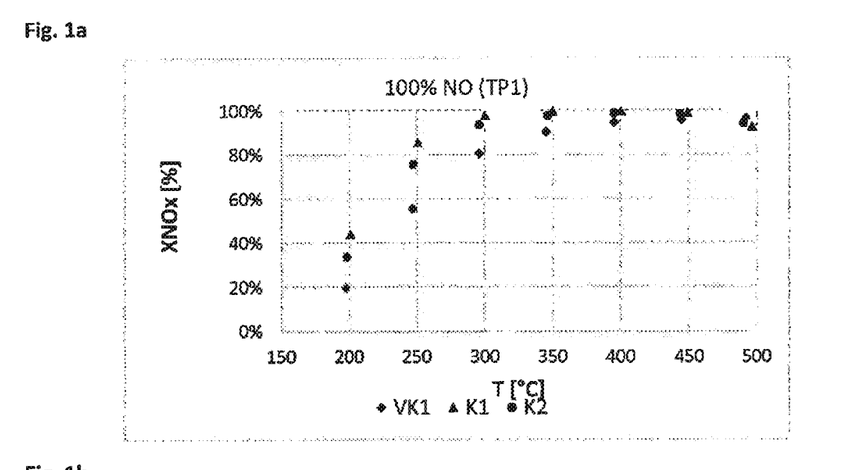
Figure 1B:
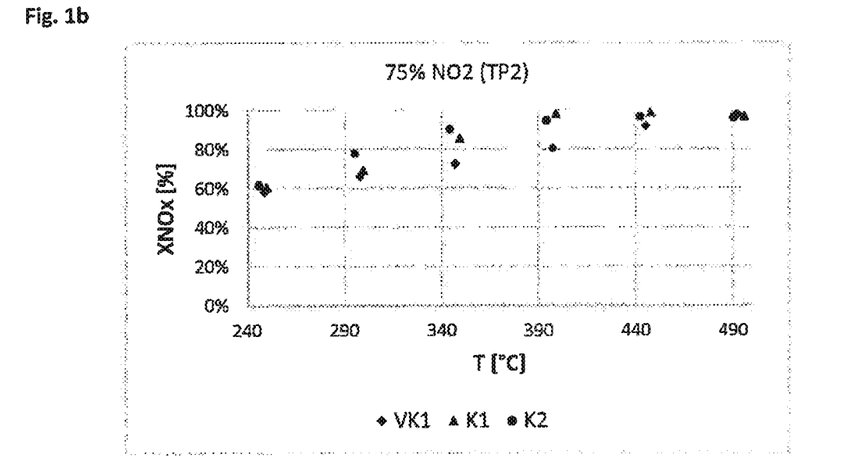
Figure 1C:
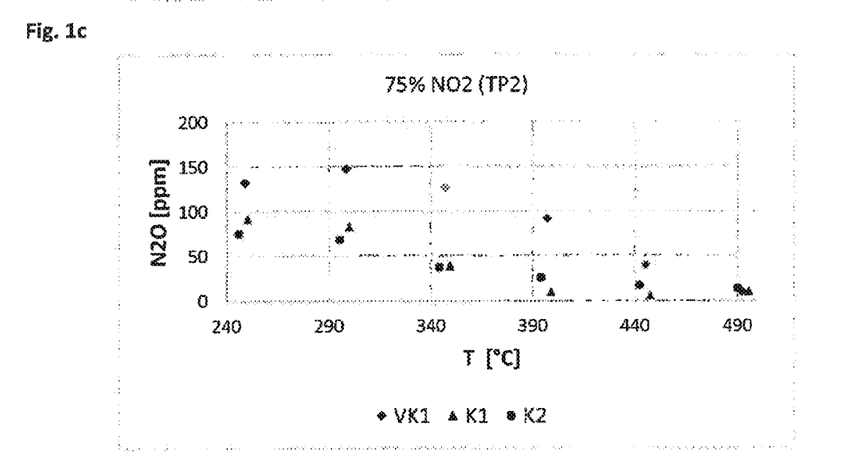
Figure 2A:
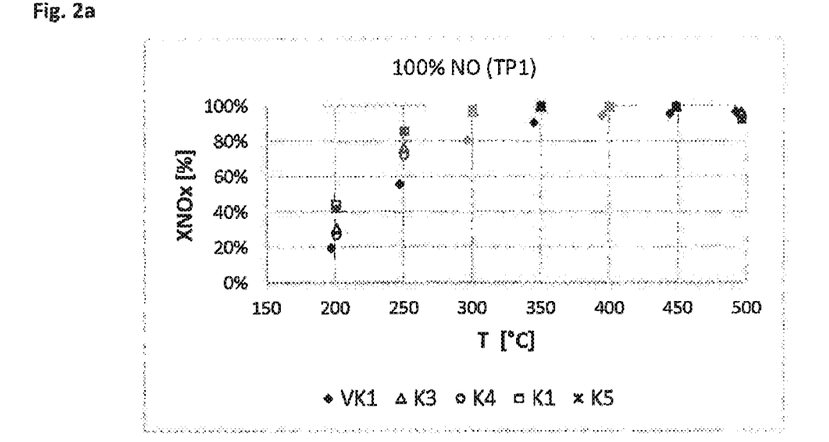
Figure 2B:
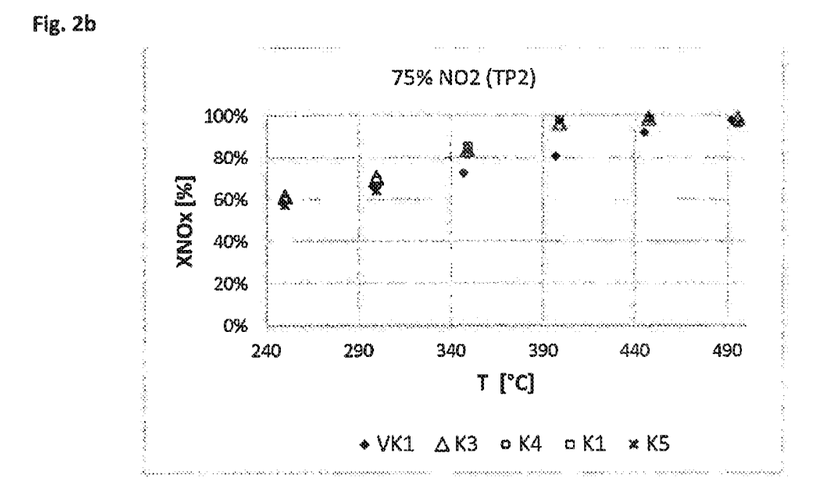

FIGS. 1 and 2 show the dependence of the conversion of nitrogen monoxide (see FIG. 1) or of nitrogen dioxide ($NO_2/NOX=75\%$) (see FIG. 2) on the cerium content of the SCR catalyst.

In FIGS. 1 and 2:

Reference=SCR catalyst consisting of 3% $V_2O_5$, 4.3% $WO_3$ and the remainder $TiO_2$ with 5% $SiO_2$ 1% cerium oxide=as reference, but $TiO_2/SiO_2$ replaced by cerium oxide up to a cerium oxide content of the catalyst of 1%

5% cerium oxide=as reference, but $TiO_2/SiO_2$ replaced by cerium oxide up to a cerium oxide content of the catalyst of 5%

10% cerium oxide=as reference, but $TiO_2/SiO_2$ replaced by cerium oxide up to a cerium oxide content of the catalyst of 10%

The catalysts were coated in the usual way on commercially available flow-through substrates with a wash coat loading of 160 g/l and the NOx conversion was measured at GHSV=60000 1/h with the following test gas composition: NOx: 1000 ppm

| | |
|---|---|
| $NO_2/NOx$: | 0% (FIG. 1) or 75% (FIG. 2) |
| $NH_3$: | 1100 ppm (FIG. 1) or 1350 ppm (FIG. 2) |
| $O_2$: | 10% |
| $H_2O$: | 5% |
| $N_2$: | Remainder |

As shown in FIG. 1, the conversion of NO deteriorates as the content of cerium oxide increases, while in FIG. 2, the conversion at $NO_2/NOx=75\%$ improves as the content of cerium oxide increases.

Example 1: Preparation of the Coating Suspensions (Wash Coats)

Preparation of Coating Suspension A (Vanadium SCR)

A commercially available titanium dioxide in the anatase form doped with 5 wt % silicon dioxide was dispersed in water. Next, an aqueous solution of ammonium metatungstate and ammonium metavanadate dissolved in oxalic acid were added as a tungsten or vanadium precursor in an amount such that a catalyst of composition 87.4 wt % $TiO_2$, 4.6 wt % $SiO_2$, 5.0 wt % $WO_3$ and 3.0 wt % $V_2O_5$ was the result. The mixture was stirred thoroughly and finally homogenized in a commercially available agitator ball mill and ground to d90<2 μm.

Preparation of Coating Suspension B (Vanadium SCR with 1% Cerium Oxide)

A commercially available titanium dioxide in the anatase form doped with 5 wt % silicon dioxide was dispersed in water. Next, an aqueous solution of ammonium metatungstate as a tungsten precursor, ammonium metavanadate dissolved in oxalic acid as a vanadium precursor, and an aqueous solution of cerium acetate as a cerium precursor were added in an amount such that a catalyst of a composition that is calculated as 86.4 wt % $TiO_2$, 4.6 wt % $SiO_2$, 5.0 wt % WO3, and 3.0 wt % $V_2O_5$ and 1% $CeO_2$ was the result. The mixture was stirred thoroughly and finally homogenized in a commercially available agitator ball mill and ground to d90<2 μm.

Preparation of Coating Suspension C (Fe SCR, SAR=25)

A coating suspension was prepared for a commercially available SCR catalyst based on an iron-exchanged beta zeolite. For this purpose, a commercial $SiO_2$ binder, a commercial boehmite binder (as coating aids), iron(III) nitrate nonahydrate, and commercially available beta zeolite having a molar $SiO_2/Al_2O_3$ ratio (SAR) of 25 were suspended in water so that a catalyst of composition 90 wt % β-zeolite and an iron content, calculated as $Fe_2O_3$, of 4.5 wt % was the result.

Preparation of Coating Suspension D (Fe-SCR, SAR=10)

A coating suspension was prepared for a commercially available SCR catalyst based on an iron-exchanged beta zeolite. For this purpose, a commercial $SiO_2$ binder, a commercial boehmite binder (as coating aids), iron(III) nitrate nonahydrate, and commercially available beta zeolite having a molar $SiO_2/Al_2O_3$ ratio (SAR) of 10 were suspended in water so that a catalyst of composition 90 wt % β-zeolite and an iron content, calculated as $Fe_2O_3$, of 4.5 wt % was the result.

Example 2: Preparation of the Catalyst Devices

Various catalyst devices were prepared by coating ceramic substrates with coating suspensions A to D. Conventional ceramic monoliths with parallel flow channels (flow-through substrates) open at both ends were used as substrates. In this case, a first and a second layer (S1, S2) were applied to each substrate, wherein each layer was subdivided into two adjacent zones (Z1, Z2). The exhaust gases to be purified flow in the flow direction into the catalyst device, i.e. via the upper layer 2 and from zone 1 to zone 2. In Scheme 1, the structure of the catalyst devices is shown with four catalytic regions located in two layers and two zones.

Scheme 1: Schematic Structure of the Catalyst Devices Produced According to the Exemplary Embodiments Flow Direction→

| Substrate | |
|---|---|
| Layer 2 Zone 1 (S2Z1) | Layer 2 Zone 2 (S2Z2) |
| Layer 1 Zone 1 (S1Z1) | Layer 1 Zone 2 (S1Z2) |

The compositions and the amounts of coating suspensions A to D used are summarized in Table 1 below. The table also shows which catalytic layers S1 and S2 and zones Z1 and Z2 were applied. The catalysts VK1 and VK3 are comparative catalysts.

First of all, starting from the inlet side, one of dispersions A to D was applied by a conventional dipping method over the length of region Z1S1 of a commercially available flow-through substrate having 62 cells per square centimeter, a cell wall thickness of 0.17 millimeters and a length of 76.2 mm. The partially coated component was first dried at 120° C., Next, starting from the outlet side, one of dispersions A to D was applied over the length of region Z2S1 by the same method. The coated component was then dried at 120° C., for 15 minutes at 350° C., then calcined at 600° C. for a period of 3 hours. When dispersion and wash coat loading were identical in regions Z1S1 and Z2S1, one of dispersions A-D was applied by a conventional dipping method to a commercially available flow-through substrate having 62 cells per square centimeter and a cell wall thickness of 0.17 millimeters over its entire length of 76.2 mm. It was then dried at 120° C., for 15 minutes at 350° C., then calcined at 600° C. for a period of 3 hours.

Starting from the inlet side, the component thus calcined was then coated according to the aforementioned method over the length of region Z1S2 with one of suspensions A-D and dried at 120° C. The above-described step was skipped when no coating was provided for region Z1S2. Starting from the outlet side, the coating was then applied over the length of region Z2S2 using one of suspensions A-D. It was then dried at 120° C. The above-described step was skipped when no coating was provided for region Z2S2. It was then dried for 15 minutes at 350° C., then calcined at 600° C. for a period of 3 hours. When dispersion and wash coat loading were identical in regions Z1S2 and Z2S2, one of dispersions A-D was applied over the entire length of the component of 76.2 mm by the method described above. It was then dried at 120° C., for 15 minutes at 350° C., then calcined at 600° C. for a period of 3 hours.

TABLE 1

Preparation of the catalyst devices having coating suspensions A to D in the first and second (S1, S2) and in the first and second zone (Z1, Z2). This shows in each case the total quantity in g/l in each of the four regions (S1Z1 to S2Z2) after drying, calcination and heat treatment, and also the length of the zones in % based on the total length of the catalyst device. The catalysts VK1 to VK4 are comparative catalyts.

| | Metal | | Coating suspension | |
|---|---|---|---|---|
| No. | Z1S2 Z1S1 | Z2S2 Z2S1 | Z1S2 Z1S1 | Z2S2 Z2S1 |
| VK1 | Fe V | Fe V | 100 g/l C, L = 50% 280 g/l A, L = 50% | 100 g/l C, L = 50% 280 g/l A, L = 50% |
| VK3 | Fe Fe | V V | 65 g/l D, L = 33% 65 g/l D, L = 33% | 140 g/l A, L = 67% 140 g/l A, L = 67% |
| K1 | V Fe | V Fe | 280 g/l A, L = 50% 100 g/l C, L = 50% | 280 g/l A, L = 50% 100 g/l C, L = 50% |
| K2 | V—Ce Fe | V—Ce Fe | 280 g/l B, L = 50% 50 g/l C, L = 50% | 280 g/l B, L = 50% 50 g/l C, L = 50% |
| K3 | V Fe | V Fe | 160 g/l A, L = 50% 100 g/l C, L = 50% | 160 g/l A, L = 50% 100 g/l C, L = 50% |
| K4 | V Fe | V Fe | 160 g/l A, L = 50% 50 g/l C, L = 50% | 160 g/l A, L = 50% 50 g/l C, L = 50% |
| K5 | V Fe | V Fe | 280 g/l A, L = 50% 50 g/l C, L = 50% | 280 g/l A, L = 50% 50 g/l C, L = 50% |
| K6 | V Fe | V Fe | 160 g/l A, L = 50% 100 g/l D, L = 50% | 160 g/l A, L = 50% 100 g/l D, L = 50% |

As an alternative to the described method, it would also be possible to prepare two catalysts (Z1, Z2) corresponding to zones Z1 and Z2 described above and to test the two catalysts one after the other (Z1 before Z2).

Catalyst Z1: First of all, apply one of dispersions A to D over the entire length of the substrate with the length Z1 (Z1S1 region), dry at 120° C., then for 15 minutes at 350° C., then calcine at 600° C. for a period of 3 hours. If so intended, apply one of dispersions A to D over the entire length of the component thus obtained (Z1S2 region), then [dry] for 15 minutes at 350° C., then calcine at 600° C. for a period of 3 hours.

Catalyst Z2; First of all, apply one of dispersions A to D over the entire length of the substrate with the length Z2 (Z2S1 region), dry at 120° 0, then for 15 minutes at 350° C., then calcine at 600° C. for a period of 3 hours. If so intended, next apply one of dispersions A to D over the entire length of the component thus obtained (Z2S2 region), then [dry] for 15 minutes at 350° C., then calcine at 600° C. for a period of 3 hours.

Example 3: Reduction of Nitrogen Oxides by SCR

Measurement Method

The catalyst devices prepared according to Example 2 were tested for their activity and selectivity in the selective catalytic reduction of nitrogen oxides. In doing so, the nitrogen oxide conversion was measured at various defined temperatures (measured on the inlet side of the catalyst) as a measure of the SCR activity and the formation of nitrous oxide. On the inlet side, model exhaust gases containing preset proportions of NO, $NH_3$, $NO_2$ and $O_2$, among other things, were introduced. The nitrogen oxide conversions were measured in a reactor made of quartz glass. Drill cores with L=3" and D=1" were tested between 190 and 550° C. under steady-state conditions. The measurements were taken under the test conditions summarized below. GHSV is the gas hourly space velocity (gas flow rate:catalyst volume). The conditions of measurement series TP1 and TP2 are summarized below:

Test Parameter Set TP1:

Gas hourly space velocity GHSV=60000 1/h with the synthesis gas composition: 1000 vppm NO, 1100 vppm $NH_3$, 0 vppm $N_2O$ $a=xNH_3/xNO_x=1.1$ $xNO_x=xNO+xNO_2+XN_2O$, wherein x in each case means a concentration (vppm) of 10 vol % $O_2$, 5 vol % $H_2O$, remainder $N_2$.

Test Parameter Set TP2:

GHSV=60000 1/h with the synthesis gas composition: 250 vppm NO, 750 vppm $NO_2$, 1350 vppm $NH_3$, 0 vppm $N_2O$ $a=xNH_3/xNO_x=1.35$ $xNO_x=xNO+xNO_2+xN_2O$, wherein x in each case means a concentration (vppm) of 10 vol % $O_2$, 5 vol % $H_2O$, remainder $N_2$.

The nitrogen oxide concentrations (nitrogen monoxide, nitrogen dioxide, nitrous oxide) were measured downstream of the catalyst device. The nitrogen oxide conversion over the catalyst device for each temperature measurement point was calculated as follows from the nitrogen oxide contents set in the model exhaust gas, which were verified during conditioning at the beginning of particular test run with a pre-catalyst exhaust gas analysis, and from the measured nitrogen oxide contents after the catalyst device (x is in each case the concentration in vppm):

$$U_{NOx}[\%]=(1-X_{output}(NO_x)/X_{input}(NO_x))*100[\%]$$

with $$X_{input}(NO_x)=X_{input}(NO)+X_{input}(NO_2)$$

$$X_{output}(NO_x)=X_{output}(NO)+X_{output}(NO_2)+2*X_{output}(N_2O).$$

$X_{output}(N_2O)$ was weighted with the factor 2 in order to take the stoichiometry into account.

In order to determine the manner in which aging of the catalysts affects the result, the catalyst devices were subjected to hydrothermal aging for 100 hours at 580° C. in a gas atmosphere (10% $O_2$, 10% $H_2O$, remainder $N_2$). Next, the conversions of nitrogen oxides were determined according to the method described above.

Results

The results of measurement series TP1, in which the model exhaust gas contained only NO as the nitrogen oxide, are summarized in Table 2. The results of measurement series TP2, wherein the model exhaust gas contained NO and $NO_2$ in the ratio 1:3 as the nitrogen oxides, are summarized in Table 3. In each case, the tables indicate which catalyst according to Example 2 (Table 1) was used. For each defined temperature value, it is indicated what percentage of the initial concentration of NOx was removed. Table 3 also specifies for each temperature value 2 to 7 what absolute quantity of $N_2O$ was measured at each temperature value after the catalyst. In FIGS. 1 to 5, the results are also shown graphically for the purposes of comparison. Tables 4 and 5 summarize the conditions and results of the tests with catalyst devices after aging.

FIGS. 1a, b show that catalysts K1 and K2 according to the invention, in which a first, upper layer with a vanadium catalyst overlies a second, lower layer with an iron exchanged zeolite, remove nitrogen oxides significantly more efficiently than a comparative catalyst VK1, in which a layer with iron-exchanged zeolite overlies a vanadium oxide layer. The effect is particularly pronounced at temperatures below about 400° C. The effect is obtained even in the case of a model exhaust gas having a high $NO_2$ content of 66.7% (FIG. 1b). FIG. 1c shows that significantly less $N_2O$ is formed with catalysts K1 and K2 according to the invention than with catalyst VK1. This effect is also particularly pronounced at temperatures below 400° C.

Catalysts K1 and K2 differ in that catalyst K2 contains a cerium oxide in the first, upper layer in addition to the vanadium oxide. The results show that in particular in the temperature range below 350° C., a further improvement is achieved by adding a cerium oxide, wherein both the removal of NOx is further improved and the formation of $N_2O$ is further reduced.

Figure 2C:
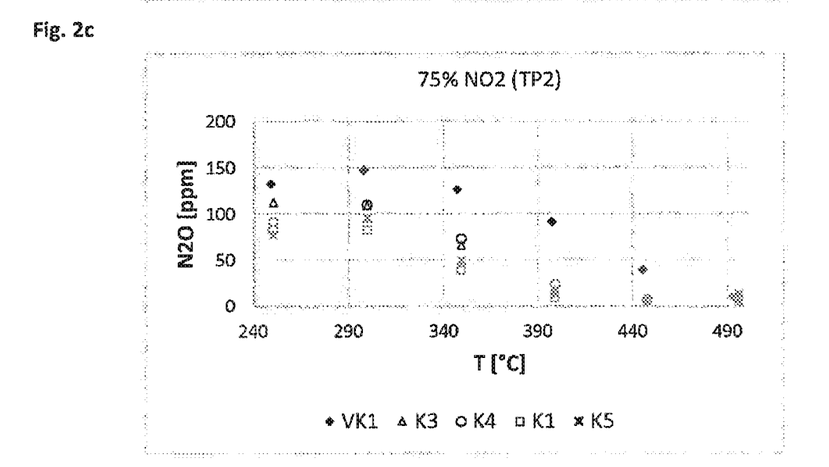

In FIG. 2, further comparisons of the conventional catalyst VK1 and catalysts K1, K3, K4 and K5 according to the invention are shown in graph form, wherein the catalysts according to the invention differ with regard to the amount of the catalysts used in the upper and lower layers. The results show that even with considerable variation in the amounts of catalyst, a significant effect is achieved. Catalyst K1 shows the most pronounced effect in preventing the formation of $N_2O$ (FIG. 2c).

Figure 3A:
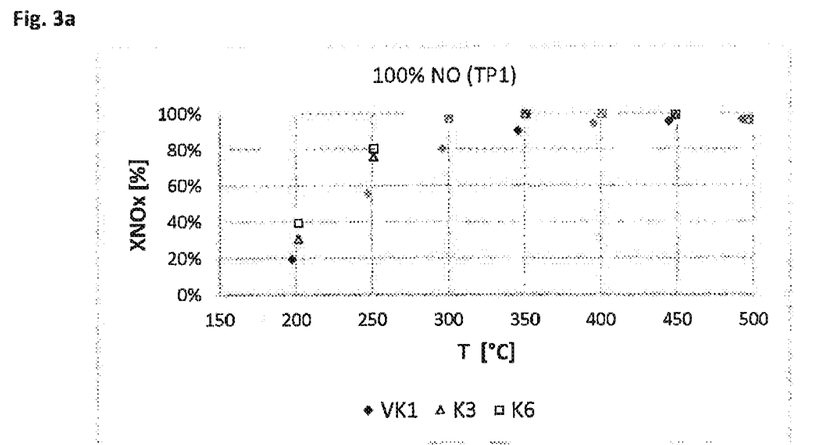
Figure 3B:
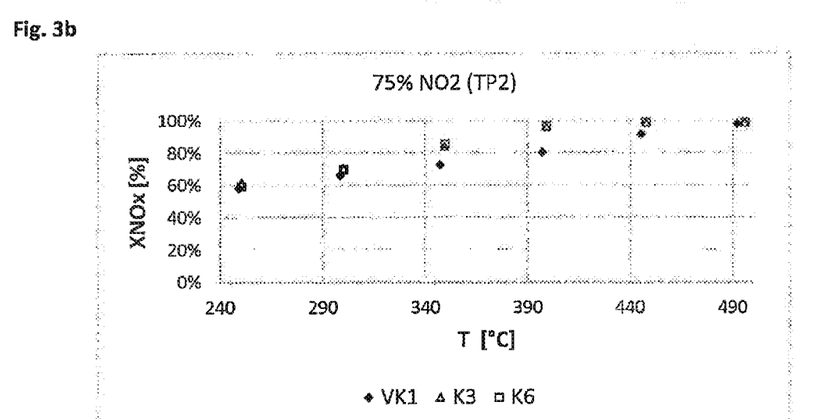
Figure 3C:
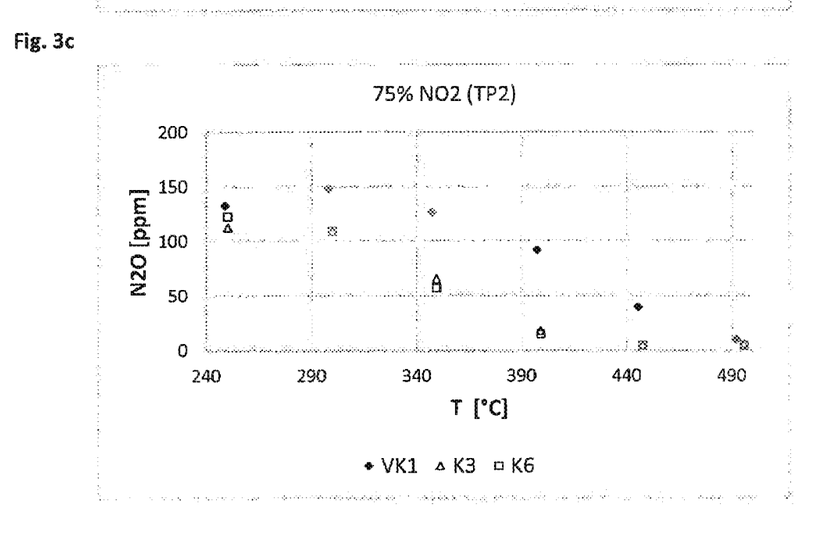

FIG. 3 shows a comparison of the conventional catalyst VK1 and catalysts K3 and K6 according to the invention. FIG. 3 also demonstrates that the catalysts according to the invention remove NOx considerably more efficiently while significantly reducing the formation of $N_2O$.

Figure 4A:
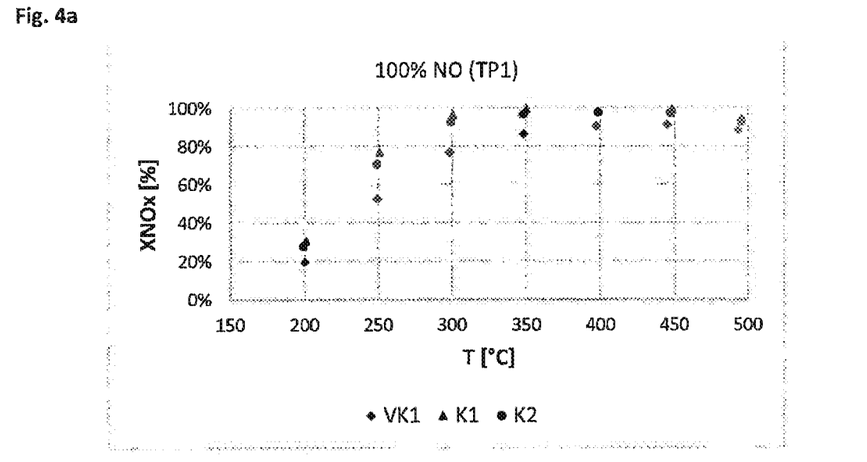
Figure 4B:
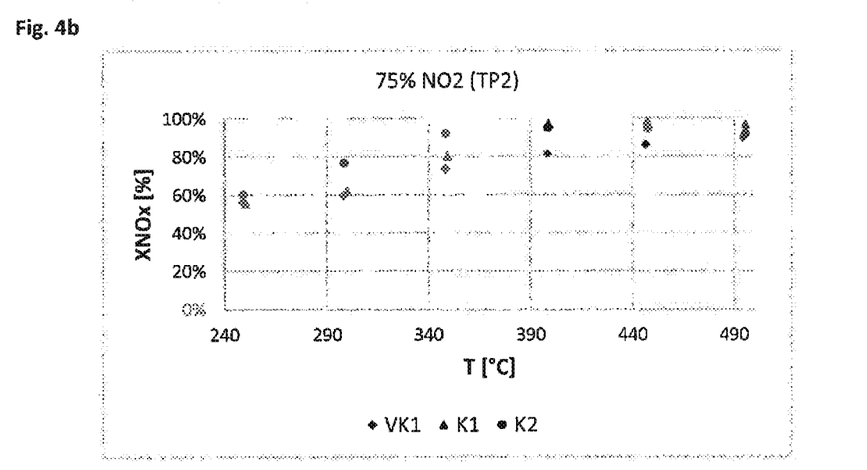
Figure 4C:
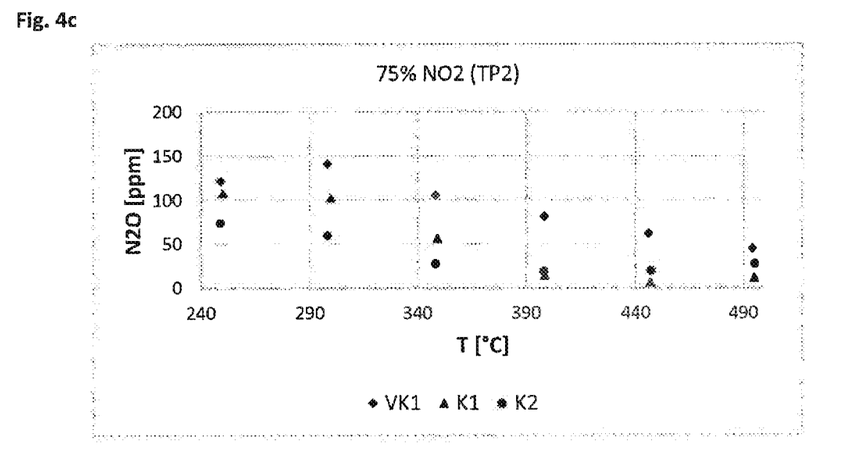

FIG. 4 shows results for catalyst devices subjected to an artificial aging process as described above. FIG. 4 shows a comparison of the conventional catalyst VK1 with catalysts K1 and K2 according to the invention. The results show that, even after aging, the catalyst according to the invention depletes NOx significantly more efficiently and reduces the formation of $N_2O$ more than the comparative catalyst. The tests also show that the advantages of having cerium oxide in the vanadium catalyst are particularly pronounced especially after aging. When adding cerium oxide, a more significant improvement of catalyst K2 compared to the comparative catalyst but also compared to catalyst K1 is found both in the depletion of NOx and in the prevention of nitrous oxide.

Figure 5A:
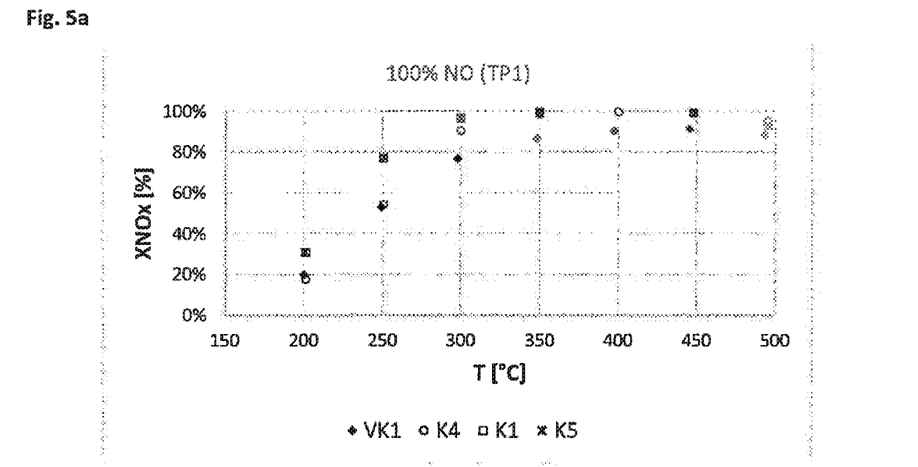
Figure 5B:
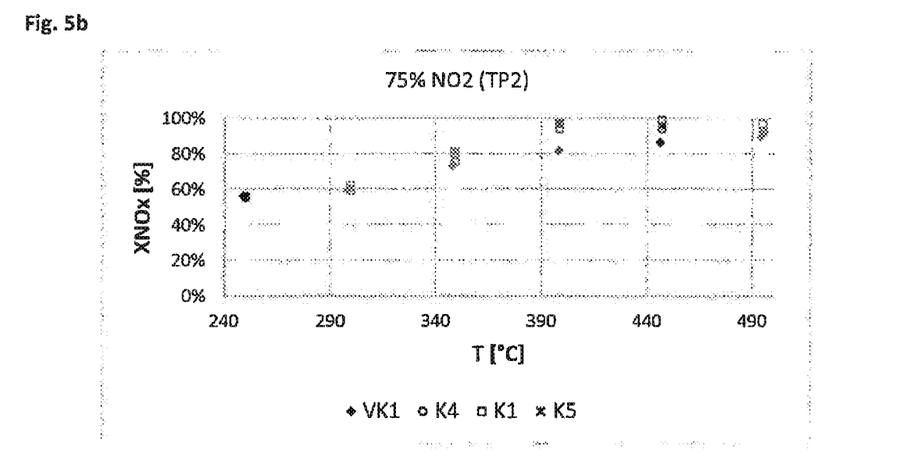
Figure 5C:
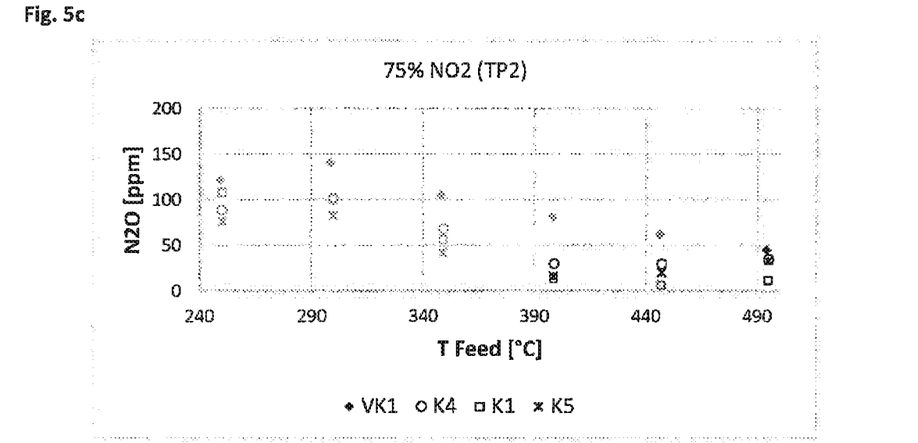

FIG. 5 shows further results obtained with catalysts after the aging process for catalysts K1, K4 and K5 according to the invention and for comparative catalyst VK1. FIG. 5 also shows a marked improvement of the catalysts according to the invention after aging with regard to the NOx depletion and the prevention of the formation of nitrous oxide.

In the case of comparative catalyst VK3, the two catalysts are not in layers one on top of the other, but the exhaust gases first enter a zone with the iron-containing zeolite on the inlet side and then pass into an outlet-side zone with the vanadium catalyst. The results summarized in Tables 2 and 3 show that such a comparative catalyst not only exhibits comparatively low conversions of NOx with both with exhaust gases rich in NO and with exhaust gases rich in $NO_2$ but also causes a greater formation of nitrous oxide.

Overall, the experiments show that the SCR catalysts according to the invention, in which a vanadium oxide layer is disposed on a zeolite layer containing iron, deliver significant improvements in the removal of NOx and the prevention of the formation of nitrous oxide. The catalyst devices according to the invention are suitable not only for the reaction with exhaust gases rich in NO but also for the treatment of exhaust gases rich in $NO_2$. The advantages with exhaust gases rich in $NO_2$ are particularly pronounced in the temperature range below 450° C. or below 350° C. The catalyst devices according to the invention thus combine several advantageous properties, namely a high efficiency with exhaust gases rich in $NO_2$ in the temperature range from about 180° C. to 500° C., and in particular at low temperatures; a high efficiency with exhaust gases rich in NO; and the prevention of the formation of nitrous oxide. The effects are evident both with freshly prepared catalysts and after an aging process. The effect can even be improved, if a cerium oxide is added to the vanadium catalyst, which is in particular advantageous in the case of aged catalysts.

TABLE 2

Conditions and results of the reduction of NO with different catalyst devices (test TP1) at different actually measured temperatures 1 to 8. The depletion of NOx at the catalyst device outlet is shown in % based on the initial amount used.

| Test | | Temperature [° C.] | | | | | | | | NOx [%] | | | | | | | |
|---|---|---|---|---|---|---|---|---|---|---|---|---|---|---|---|---|---|
| | TP | 1 | 2 | 3 | 4 | 5 | 6 | 7 | 8 | 1 | 2 | 3 | 4 | 5 | 6 | 7 | 8 |
| VK1 | 1 | 541 | 492 | 444 | 395 | 345 | 296 | 247 | 197 | 93% | 97% | 96% | 95% | 91% | 81% | 56% | 20% |
| VK3 | 1 | 535 | 489 | 442 | 394 | 344 | 295 | 246 | 197 | 88% | 95% | 98% | 98% | 97% | 93% | 73% | 31% |
| K1 | 1 | 543 | 496 | 449 | 400 | 350 | 300 | 251 | 201 | 67% | 93% | 99% | 100% | 100% | 98% | 86% | 44% |
| K2 | 1 | 537 | 490 | 443 | 395 | 346 | 296 | 247 | 198 | 78% | 94% | 98% | 99% | 98% | 94% | 76% | 34% |
| K3 | 1 | 542 | 496 | 448 | 400 | 350 | 300 | 251 | 201 | 76% | 96% | 99% | 100% | 100% | 97% | 76% | 31% |

TABLE 2-continued

Conditions and results of the reduction of NO with different catalyst devices (test TP1) at different actually measured temperatures 1 to 8. The depletion of NOx at the catalyst device outlet is shown in % based on the initial amount used.

| Test | | Temperature [° C.] | | | | | | | | NOx [%] | | | | | | | |
|---|---|---|---|---|---|---|---|---|---|---|---|---|---|---|---|---|---|
| | TP | 1 | 2 | 3 | 4 | 5 | 6 | 7 | 8 | 1 | 2 | 3 | 4 | 5 | 6 | 7 | 8 |
| K4 | 1 | 543 | 496 | 448 | 400 | 350 | 300 | 250 | 201 | 72% | 95% | 99% | 100% | 100% | 96% | 72% | 27% |
| K5 | 1 | 543 | 496 | 448 | 400 | 350 | 300 | 251 | 201 | 65% | 92% | 99% | 100% | 100% | 98% | 86% | 42% |
| K6 | 1 | 543 | 496 | 448 | 400 | 350 | 300 | 250 | 201 | 78% | 97% | 100% | 100% | 100% | 97% | 80% | 40% |

TABLE 3

Test conditions and results of the reduction of $NO_2$:NO in the ratio 3:1 (test TP2) at different actually measured temperatures. For measurements 2 to 7, the depletion of NOx at the catalyst device outlet is shown in % based on the initial amount used and the measured values for $N_2O$ at the catalyst device outlet are shown in ppm.

| | Test | Temperature [° C.] | | | | | | NOx [%] | | | | | | Amount of $N_2O$ [ppm] | | | | | |
|---|---|---|---|---|---|---|---|---|---|---|---|---|---|---|---|---|---|---|---|
| No. | TP | 2 | 3 | 4 | 5 | 6 | 7 | 2 | 3 | 4 | 5 | 6 | 7 | 2 | 3 | 4 | 5 | 6 | 7 |
| VK1 | 2 | 492 | 445 | 397 | 347 | 298 | 249 | 98% | 92% | 81% | 73% | 66% | 58% | 10 | 40 | 92 | 127 | 148 | 133 |
| VK3 | 2 | 489 | 441 | 392 | 343 | 293 | 244 | 97% | 95% | 89% | 80% | 65% | 62% | 12 | 27 | 56 | 83 | 98 | 56 |
| K1 | 2 | 496 | 447 | 399 | 349 | 300 | 250 | 97% | 99% | 98% | 86% | 69% | 60% | 10 | 5 | 9 | 39 | 83 | 92 |
| K2 | 2 | 490 | 442 | 394 | 344 | 295 | 246 | 96% | 97% | 95% | 90% | 78% | 82% | 14 | 17 | 26 | 38 | 69 | 76 |
| K3 | 2 | 496 | 447 | 399 | 349 | 300 | 250 | 99% | 99% | 96% | 84% | 71% | 62% | 6 | 5 | 19 | 66 | 110 | 113 |
| K4 | 2 | 496 | 448 | 399 | 349 | 300 | 250 | 98% | 98% | 95% | 82% | 67% | 60% | 9 | 8 | 24 | 73 | 110 | 83 |
| K5 | 2 | 496 | 447 | 399 | 349 | 300 | 250 | 97% | 99% | 97% | 83% | 65% | 58% | 14 | 7 | 13 | 50 | 96 | 78 |
| K6 | 2 | 496 | 447 | 399 | 349 | 300 | 250 | 99% | 99% | 97% | 86% | 70% | 59% | 5 | 5 | 15 | 58 | 110 | 123 |

TABLE 4

Conditions and results of the reduction of NO with different catalyst devices after aging (test TP1) at different actually measured temperatures 1 to 8. The depletion of NOx at the catalyst device outlet is shown in % based on the initial amount used.

| | Test | Temperature [° C.] | | | | | | | | NOx [%] | | | | | | | |
|---|---|---|---|---|---|---|---|---|---|---|---|---|---|---|---|---|---|
| No. | TP | 1 | 2 | 3 | 4 | 5 | 6 | 7 | 8 | 1 | 2 | 3 | 4 | 5 | 6 | 7 | 8 |
| VK1 | 1 | 539 | 493 | 445 | 397 | 348 | 298 | 249 | 200 | 79% | 88% | 91% | 91% | 87% | 77% | 53% | 20% |
| K1 | 1 | 542 | 496 | 448 | 400 | 350 | 300 | 251 | 201 | 74% | 95% | 99% | 100% | 100% | 97% | 77% | 31% |
| K2 | 1 | 543 | 495 | 447 | 398 | 348 | 299 | 249 | 199 | 70% | 93% | 97% | 98% | 97% | 93% | 71% | 28% |
| K4 | 1 | 542 | 496 | 448 | 400 | 350 | 300 | 250 | 201 | 77% | 95% | 99% | 100% | 99% | 90% | 54% | 17% |
| K5 | 1 | 542 | 496 | 448 | 400 | 350 | 300 | 250 | 201 | 68% | 93% | 99% | 100% | 100% | 97% | 77% | 31% |

TABLE 5

Test conditions and results of the reduction of $NO_2$:NO in the ratio 3:1 (test TP2) with different catalyst devices after aging at different actually measured temperatures. For measurements 2 to 7, the depletion of NOx at the catalyst device outlet is shown in % based on the initial amount used and the measured values for N2O at the catalyst device outlet are shown in ppm.

| | Test | Temperature [° C.] | | | | | | NOx [%] | | | | | | Amount of $N_2O$ [ppm] | | | | | |
|---|---|---|---|---|---|---|---|---|---|---|---|---|---|---|---|---|---|---|---|
| No. | TP | 2 | 3 | 4 | 5 | 6 | 7 | 2 | 3 | 4 | 5 | 6 | 7 | 2 | 3 | 4 | 5 | 6 | 7 |
| VK1 | 2 | 494 | 446 | 398 | 348 | 298 | 249 | 90% | 87% | 82% | 74% | 60% | 57% | 45 | 62 | 81 | 106 | 141 | 122 |
| K1 | 2 | 495 | 447 | 398 | 349 | 299 | 250 | 97% | 99% | 97% | 80% | 62% | 56% | 12 | 7 | 14 | 56 | 102 | 108 |
| K2 | 2 | 495 | 447 | 398 | 348 | 298 | 249 | 92% | 95% | 95% | 92% | 77% | 60% | 28 | 20 | 19 | 28 | 60 | 74 |
| K4 | 2 | 495 | 447 | 399 | 349 | 300 | 250 | 93% | 94% | 94% | 76% | 59% | 56% | 35 | 30 | 30 | 68 | 100 | 89 |
| K5 | 2 | 495 | 447 | 398 | 349 | 300 | 250 | 92% | 96% | 97% | 81% | 61% | 56% | 34 | 20 | 16 | 42 | 83 | 76 |

The invention claimed is:

1. A catalyst device for purifying exhaust gases containing nitrogen oxide by selective catalytic reduction (SCR), comprising at least two catalytic layers, the first layer comprises the following components:

(a) from 0.5 to 10 wt % vanadium oxide, calculated as $V_2O_5$,
(b) from 0 to 17 wt % tungsten oxide, calculated as $WO_3$,
(c) from 0.2 to 10 wt % cerium oxide, calculated as $CeO_2$,
(d) from 25 to 98 wt % titanium oxide, calculated as $TiO_2$, (e) from 0.5 to 15 wt % silicon oxide, calculated as $SiO_2$,
(f) from 0 to 15 wt % aluminum oxide, calculated as $Al_2O_3$, in each case based on the weight of the first layer, and the second layer containing a molecular sieve containing iron, wherein the first layer is applied onto the second layer.

2. The catalyst device according to claim 1, wherein, in addition to components (a), (c), (d) and (e), the first layer contains a quantity of at least one of (b) and (f).

3. The catalyst device according to claim 1, wherein the molecular sieve is a zeolite.

4. The catalyst device according to claim 3, wherein the zeolite is an iron-exchanged zeolite.

5. The catalyst device according to claim 3, wherein the zeolite has a structure, whose maximum ring size has more than 8 tetrahedra.

6. The catalyst device according to claim 3, wherein the zeolite has a structure selected from AEL, AFI, AFO, AFR, ATO, BEA, GME, HEU, MEI, MWW, EUO, FAU, FER, LTL, MAZ, MOR, MEL, MTW, OFF and TON.

7. The catalyst device according to claim 1, wherein the first layer is completely applied onto the second layer.

8. The catalyst device according to claim 1, wherein the first layer is applied onto the second layer in certain regions, wherein a region which has a first, upper layer is first in the flow direction, and wherein there are regions in which the lower, second layer comes into direct contact with the exhaust gases.

9. The catalyst device according to claim 1, wherein the second layer is applied onto an inert substrate.

10. The catalyst device according to claim 1, wherein the first layer contains from 1 to 5 wt % vanadium oxide, calculated as $V_2O_5$.

11. The catalyst device according to claim 1, wherein the first layer contains from 0.5 to 5 wt % cerium oxide, calculated as $CeO_2$.

12. The catalyst device according to claim 1, wherein the first layer contains from 1 to 5 wt % vanadium oxide, calculated as $V_2O_5$ and from 0.2 to 5 wt % cerium oxide, calculated as $CeO_2$.

13. The catalyst device according to claim 1, wherein the first layer contains from 0.5 to 3 wt % cerium oxide, calculated as $CeO_2$.

14. The catalyst device according to claim 1, wherein the second layer comprises at least two different iron containing zeolites.

15. The catalyst device according to claim 1 wherein
(a) is from 1 to 5 wt % vanadium oxide, calculated as $V_2O_5$,
(b) is from 1 to 15 wt % tungsten oxide, calculated as $WO_3$,
(c) is from 0.2 to 5 wt % cerium oxide, calculated as $CeO_2$,
(d) is from 73 to 98 wt % titanium oxide, calculated as $TiO_2$,
(e) is from 1 to 7 wt % silicon oxide, calculated as $SiO_2$,
(f) is from 0.5 to 15 wt % aluminum oxide, calculated as $Al_2O_3$, in each case based on the weight of the first layer.

16. A method of selective catalytic reduction (SCR), comprising utilizing a catalyst device according to claim 1 for purifying exhaust gases containing nitrogen oxide by selective catalytic reduction (SCR).

17. The method according to claim 16, wherein formation of $N_2O$ downstream of the catalyst device is limited to 50 ppm or less within the temperature range of 180° C. to 450° C.

18. A method for purifying exhaust gases, comprising the steps of:
(i) providing a catalyst device according to claim 1,
(ii) introducing exhaust gases containing nitrogen oxides into the catalyst device,
(iii) introducing a reductant containing nitrogen into the catalyst device, and
(iv) reducing nitrogen oxides in the catalyst device by selective catalytic reduction (SCR).

19. A catalyst device for purifying exhaust gases containing nitrogen oxide by selective catalytic reduction (SCR), comprising at least two catalytic layers, the first layer containing a catalytic oxide mixture and non-catalytic metal oxide support material, and the second layer containing a molecular sieve containing iron, wherein the first layer is applied onto the second layer,
wherein the catalytic oxide mixture in the first layer comprises the following components:
(a) from 0.5 to 10 wt % vanadium oxide, calculated as $V_2O_5$,
(b) from 0 to 17 wt % tungsten oxide, calculated as $WO_3$,
(c) from 0.2 to 10 wt % cerium oxide, calculated as $CeO_2$, in each case based on the weight of the first layer,
and wherein the non-catalytic metal oxide support material in the first layer comprises the following components:
(d) from 25 to 98 wt % titanium oxide, calculated as $TiO_2$,
(e) from 0.5 to 15 wt % silicon oxide, calculated as $SiO_2$,
(f) from 0 to 15 wt % aluminum oxide, calculated as $Al_2O_3$, in each case based on the weight of the first layer.

20. The catalyst device according to claim 19, wherein the amount of titanium oxide is greater than 50% wt % up to 86.4 wt %, the amount of vanadium oxide is 1 to 5 wt %; the amount of cerium oxide is 0.2 to 5 wt %, the amount of silicon oxide is 1 to 7 wt %, and the amount of tungsten oxide is 1 to 15 wt %.

21. The catalyst device according to claim 20, wherein the catalyst device is operative in use to purify exhaust gases having a $NO_2/NO_x$ ratio range of >0.5 to 0.75 while the exhaust gases temperature ranges fully within a temperature range of 180 to 450° C.

* * * * *